US012598439B2

(12) United States Patent
Varughese et al.

(10) Patent No.: US 12,598,439 B2
(45) Date of Patent: Apr. 7, 2026

(54) POWER FAULT RECOVERY MECHANISM FOR AN AUDIO SYSTEM

(71) Applicant: Harman International Industries, Incorporated, Stamford, CT (US)

(72) Inventors: Jobin Mathew Varughese, Sachse, TX (US); Paul J. Weaver, Sachse, TX (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 173 days.

(21) Appl. No.: 18/391,020

(22) Filed: Dec. 20, 2023

(65) Prior Publication Data

US 2025/0211931 A1 Jun. 26, 2025

(51) Int. Cl.
*H04R 29/00* (2006.01)
*H04R 3/12* (2006.01)

(52) U.S. Cl.
CPC ............. *H04R 29/002* (2013.01); *H04R 3/12* (2013.01)

(58) Field of Classification Search
CPC .......... H04R 3/007; H04R 3/12; H04R 27/00; H04R 29/002; H04R 29/007; H04R 2420/03; H03F 1/0211; H03F 1/305; H03F 3/181; H03F 2200/03
See application file for complete search history.

(56) References Cited

U.S. PATENT DOCUMENTS

| | | | | |
|---|---|---|---|---|
| 7,990,212 | B1 * | 8/2011 | Tsang | H03G 3/348 330/254 |
| 8,024,055 | B1 * | 9/2011 | Holmgren | G06F 1/3246 700/94 |
| 2017/0070195 | A1 * | 3/2017 | Arknæs-Pedersen | H03F 3/187 |
| 2019/0074798 | A1 * | 3/2019 | Goto | G10K 11/36 |
| 2023/0170849 | A1 * | 6/2023 | Mendenhall | H03F 1/025 381/120 |

* cited by examiner

*Primary Examiner* — Jason R Kurr
(74) *Attorney, Agent, or Firm* — BROOKS KUSHMAN P.C.

(57) ABSTRACT

In at least one embodiment, an audio system for providing a fault recovery mechanism is provided. The system includes at least one digital signal processor (DSP) and at least one host processor. The at least one DSP is programmed to process an audio input signal to transmit an audio output signal to an amplifier for playing back the audio output signal in a listening environment and to transmit metering information indicative of audio attributes employed by the at least one DSP while processing the audio input signal. The at least one host processor is programmed to receive the metering information; and to control an amplifier to deactivate playing back the audio output signal in the listening environment at least based on the at least one host processor is not receiving the metering information within a predetermined time frame.

20 Claims, 2 Drawing Sheets

POWER FAULT RECOVERY MECHANISM FOR AN AUDIO SYSTEM

TECHNICAL FIELD

Aspects disclosed herein generally relate to a power fault recovery mechanism for an audio system. More specifically, aspects disclosed herein relate to an apparatus and method for providing a power fault recovery mechanism for an audio system.

BACKGROUND

A fast boot time may be a necessary requisite for most electronic products that are prone to reboot due to any number of issues. The reboot time may be a differentiator when products such as audio systems are being compared to other audio systems in the market. For example, the time saved in performing a reboot may mitigate a potential embarrassment, particularly, in the case of line array speakers when power may be lost during a concert or performance. The faster the audio system can reboot, the faster the show can resume.

SUMMARY

In at least one embodiment, an audio system for providing a fault recovery mechanism is provided. The system includes at least one digital signal processor (DSP) and at least one host processor. The at least one DSP is programmed to process an audio input signal to transmit an audio output signal to an amplifier for playing back the audio output signal in a listening environment and to transmit metering information indicative of audio attributes employed by the at least one DSP while processing the audio input signal. The at least one host processor is programmed to receive the metering information; and to control an amplifier to deactivate playing back the audio output signal in the listening environment at least based on the at least one host processor is not receiving the metering information within a predetermined time frame.

In at least another embodiment, an audio system for providing a fault recovery mechanism is provided. The system includes at least one digital signal processor (DSP), a plurality of loudspeakers, and at least one host processor. The at least one DSP is programmed to process an audio input signal to transmit an audio output signal to an amplifier for playing back the audio output signal in a listening environment. The plurality of loudspeakers is configured to transmit the audio output signal into a listening environment. The at least one host processor is programmed to monitor a power input signal and to control an amplifier to deactivate transmitting the audio output signal to the plurality of loudspeakers at least based on at least on the at least one host processor determining that the power on the power input signal has been lost. The at least one host processor controls the amplifier to deactivate transmitting the audio output signal to the plurality of loudspeakers prior to rebooting the audio system to prevent audio artifacts from being transmitted to a plurality of loudspeakers.

In at least another embodiment, a method for providing a fault recovery mechanism. The method includes processing, via at least one digital signal processor (DSP), an audio input signal to transmit an audio output signal to an amplifier for playing back the audio output signal in a listening environment and transmitting metering information indicative of audio attributes employed by the at least one DSP while processing the audio input signal. The method further includes receiving, at least one host processor, the metering information and controlling the amplifier to deactivate playing back the audio output signal in the listening environment at least based on the at least one host processor not receiving the metering information within a predetermined time frame.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
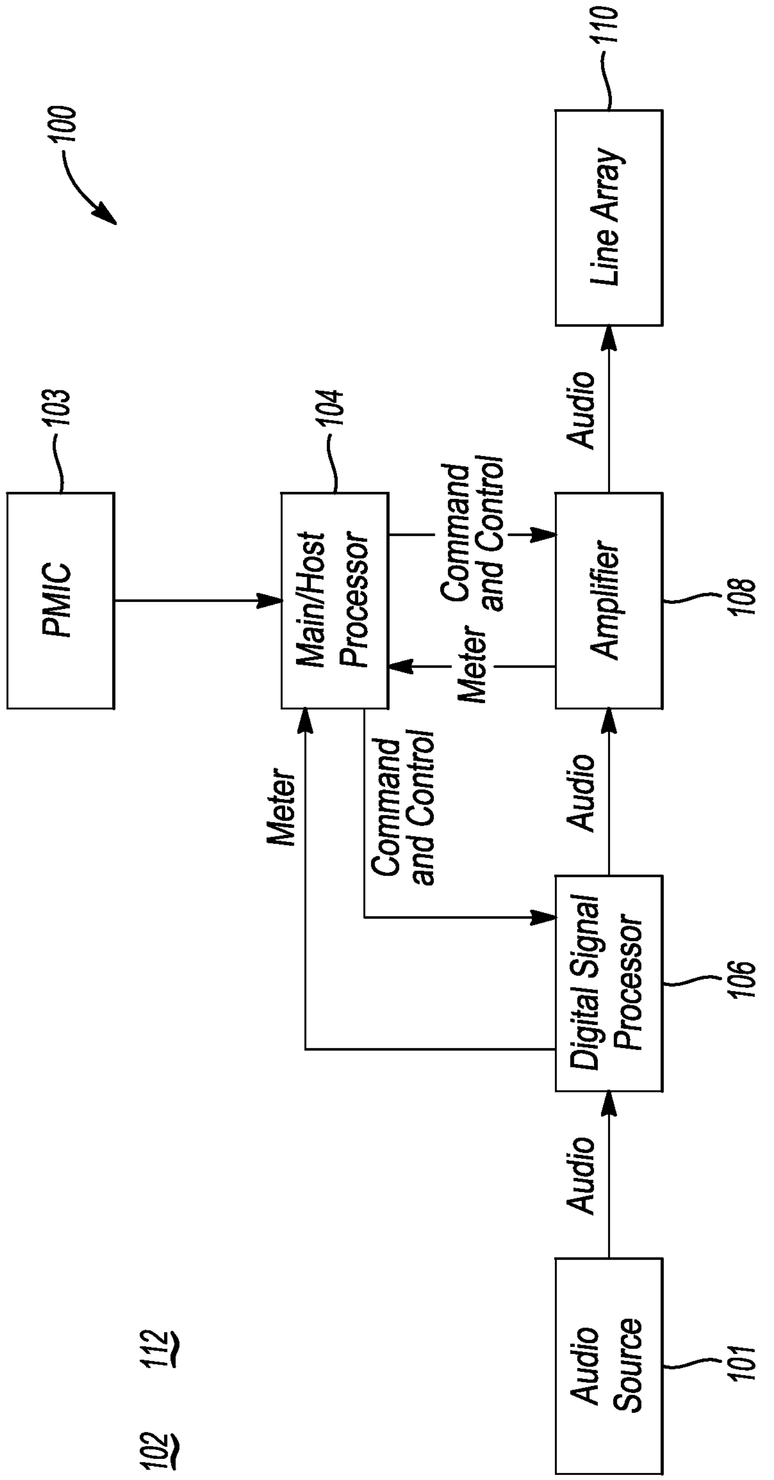
FIG. 1 generally depicts an apparatus for providing a fault recovery mechanism for an audio system in accordance with one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Aspects disclosed herein generally provide an apparatus, system, and/or method for an audio system to recover from a fault condition. The disclosed apparatus, system and/or method employs a host processor that continuously monitors information from one or more digital signal processors (DSPs), employees at least one timer and mutes one or more of the loudspeakers without rebooting the entire audio system unless such a reboot is necessary.

In general, the design of various hardware characteristics for an audio system may be difficult to implement while taking into account hardware reboots that may occur with various electronics. For example, it may be difficult to obtain a sub ten-second reboot time. Overall, the downtime associated with a reboot (or a boot up condition) for the audio system may be consequential particularly, if the reboot occurs during a concert or live performance. At a high level, most professional based audio products include a host processor and one or more digital signal processors (DSPs). The host processor may control the one or more DSPs to render audio through any number of loudspeaker arrangements. The host processor may run embedded Linux® or other non-real-time operating systems (OS) that may experience a reboot time of, for example, up to 15 seconds. In addition, the overall time to start the product application, send the DSP parameters, and start (or resume) playing audio, it may take up to 18 seconds before the show can restart.

To address the hardware reboot timing, one option may include having the DSP boot up from a flash chip that utilizes default values for the audio system to play back the audio via a loudspeaker array. Another option may involve disabling an amplifier that drives one or more loudspeakers in the array until the host processor can retransmit values from a previous session to the DSP, amplifier, and eventually to the loudspeaker array. However, the latter option may only save a few seconds and may not completely solve the boot time issue. In general, the DSP may be quickly reset, however it may be more difficult to reset the host processor.

Using a flash (or flash chip) to improve the boot time may result in unintended consequences. For example, if the flash is interrupted during a write cycle (e.g., due to a power loss), the interruption may corrupt the flash and may result in the DSP not booting up. To get around this problem, the flash chip may be connected to capacitors with very high discharge times. When the power is lost, these capacitors discharge slowly, and the DSP and the flash will have power a few seconds after a power is lost to complete the write cycle. In most operating conditions, this should be adequate. However, in cases where the power supply is unreliable and the alternating current (AC) power supply from the wall or generator drops a few cycles, there may be the condition where the host processor reboots and then continues to operate after a reboot. However, the DSP chip and flash chip connected to the capacitor with large discharge times causes the DSP chips not to reboot. In this case, the DSP may go into a bad inoperative state. This may be attributed to the DSP chips having little tolerance for bad, low, and glitchy power. This condition may cause the audio to stop. However, for the end user or sound engineer, it may seem as if everything else is normal as a display and networking continue to work as the host processor continues to operate even though the DSP processor is in a bad state.

To resolve this, the disclosed apparatus and/or system provides, for example, that there is a constant heartbeat messaging between the host processor and the DSP. One example of a heartbeat message may include metering data (or metering information) (e.g., voltage, current, audio levels etc.), where the host processor communicates with the DSP and requests audio meter values from the DSP.

One advantage of utilizing the disclosed method is that the system may not require any change in hardware. This may also be a generic fix that can be used in any condition where the DSP has stopped working but the host processor is still active. The disclosed method may assume that the temporary power glitches causing the lockdown are gone and that the power supply is stable now. Also, there may be constant heartbeat communication between the host processor and the DSP.

FIG. 1 generally depicts an apparatus 100 for providing a fault recovery mechanism for an audio system 102 in accordance with one embodiment. The apparatus 100 generally includes an audio source 101, a power supply 103, at least one main (or host) processor 104 ("the host processor 104"), at least one DSP 106, at least one amplifier 108 ("the amplifier 108"), and a plurality of loudspeakers 110. In one example, the loudspeakers 110 may be implemented as line array loudspeakers that may be positioned in listening environment 112 such as a large venue or concert hall. The apparatus 100 may be used in connection with providing audio outputs for live performances, concerts, movies, etc. It is recognized that the system 100 may also be used in connection with smaller venues such as small to mid-size venues such as bars, wedding halls, etc.

The audio source 101 provides an audio input signal. In one example, the audio source 101 may be implemented as a codec chip that outputs digital data that is in the form of audio that is to be played back by the system 100. The DSP processor 106 generally receives an audio input signal from the audio source 101. The audio input signal corresponds to audio data that is played back by the plurality of loudspeakers 110 as an audio output signal in the listening environment 112. The host processor 104 may also receive any number of commands from a user interface (not shown) to control various aspects related to the playback of the audio output signal in the listening environment. For example, the commands may correspond to changes in volume level, changes equalization parameters, and the like. The host processor 104 may run, for example, embedded Linux® or other non-real time operating systems (OS) to process the command and control the DSP 106.

The DSP 106 may include any number of filters (not shown). The filters of the DSP 106 filter the audio input signal prior to the signal being amplified by the amplifier 108. The DSP 106 also performs various functions such as adjusting the equalization parameters (e.g., bass, mid, treble, delay, reverb, etc.). The host processor 104 includes information corresponding to the volume, level, and equalization parameters as command and control signals to the DSP 106. The amplifier 108 generates the audio output signal based on the commands to reach the desired volume and power levels. The plurality of loudspeakers 110 may then audibly transmit the audio output signal into the listening environment 112.

In general, the host processor 104 controls the DSP 106 based at least in response to the commands received from the user interface. For example, the host processor 104 controls the DSP 106 by transmitting filter coefficients, the gain levels, routing paths, compression and limiting levels, etc. also on the command and control signals. The host processor 104 may also transmit command and control signals to the amplifier 108. The command and control signals provided to the amplifier 108 may correspond to mute, on/off (activate/deactivate), sleep, shutdown etc. The amplifier 108 may transmit information corresponding to a running temperature thereof back to the host processor 104 as meter (or metering data). Such meter information may be used to provide wake or sleep status of the amplifier 108 to the host processor 104. For example, when the amplifier 108 goes to sleep, the amplifier 108 may indicate that it is in a sleep mode and transmit the same to the host processor 104. It is recognized that the host processor 104 may also control the amplifier 108 to move into the sleep state (as a command and control signal). As shown, the host processor 104 generally engages in bi-directional communication with the DSP 106 and the amplifier 109. The DSP 106 also transmits metering data to the host processor 104. The metering data may correspond to clip indication, voltage readings, current readings, and audio related parameters such as audio levels and those noted abovehost processor. The GPIO port for each of the host processor 104 and the DSP 106 are separately coupled to power management integrated circuits (PMICs). The host processor 104 generally monitors a power pin connected with the PMIC to determine whether a power-down event is being requested or is occurring. In other words, the host processor 104 monitors a power input signal on the power pin to determine whether the power-down event has occurred.

The host processor 104 monitors the receipt of the metering data from the DSP 106. In the event the host processor 104 does not receive the metering information from the DSP 106, such a condition may be generally indicative of the DSP 106 exhibiting a power failure. Thus, in this regard, the host processor 104 may then execute method 200 as set forth in FIG. 2. The host processor 104 may execute the method 200 to avoid a complete reboot of the system 102 if such a reboot is not necessary. In this regard, the host processor 104 may try to mitigate completely restarting the system 102 to reduce delay of interruption of the audio output signal being provided to the listening environment 112 or to avoid retransmission of the control signals to DSP 106.

Figure 2:
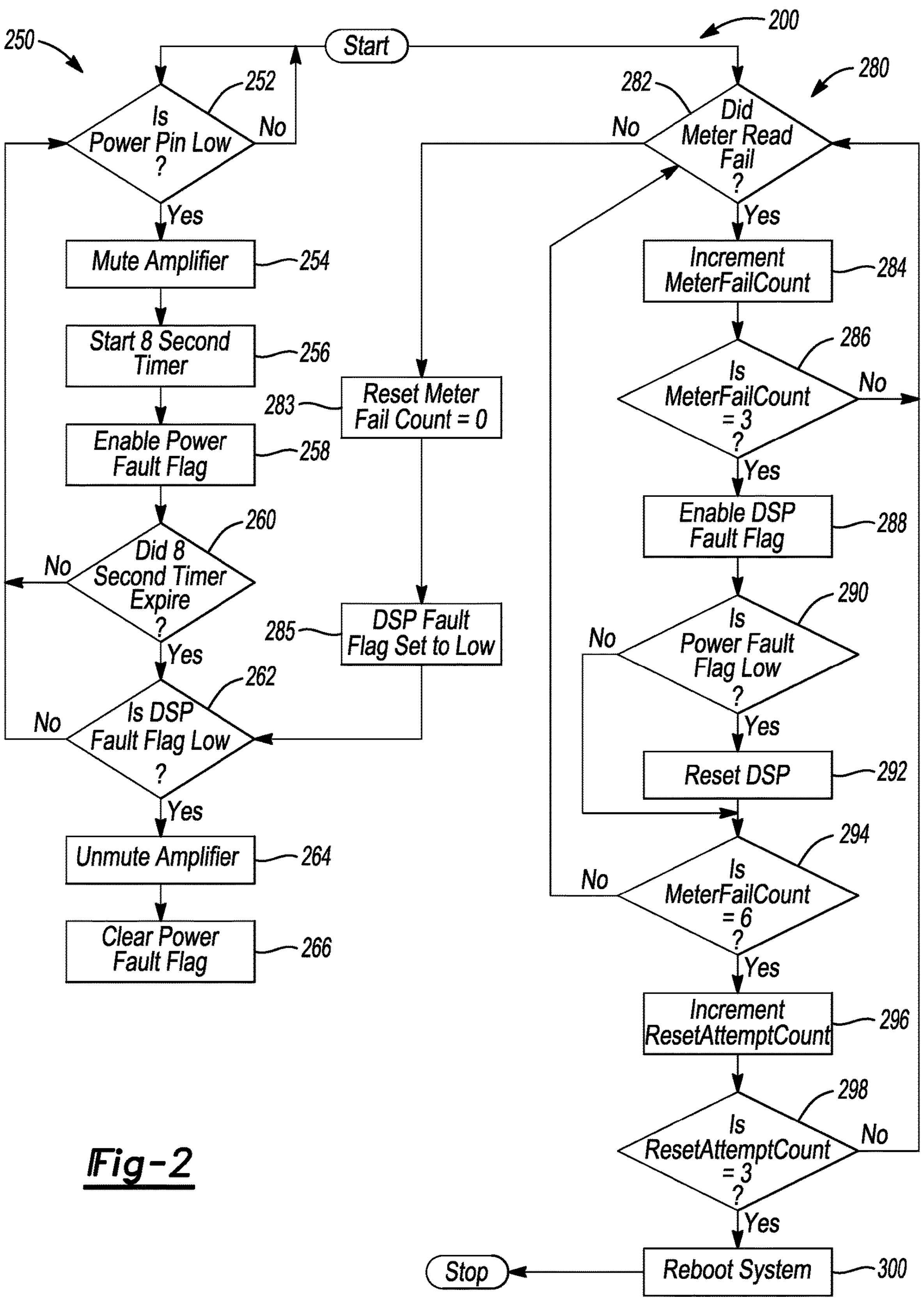
FIG. 2 generally corresponds to a method for providing the fault recovery mechanism in accordance with one embodiment.

FIG. 2 depicts the method 200 to a method for providing a fault recovery mechanism for the audio system 102 in accordance with one embodiment. The method 200 include a first track 250 and a second track 280. In one example, the method 200 may execute the first track 250 and the second track 280 simultaneously. In another example, the method 200 may execute the first track 250 and the second track 280 in parallel and the timing in which the one or more tracks 250, 280 is executed may vary.

In reference to the first track 250 and in reference to operation 252, the host processor 104 monitors a power pin on the GIPO port that is coupled to a PMIC 103 which receives power from the power supply (or the "power input signal") to determine if there has been a transition from a high to a low state. Generally, the host processor 104 monitors for such a condition to determine if a power-down event has occurred which may be indicative of the DSP 106 also exhibiting a power down event. If the power pin goes low, the host processor 104 presumes that the power connection for the DSP 106 is unstable. In some instances, the power pin on the GIPO port of the PMIC 103 may not be coupled to the DSP 106. Generally, if the power pin is low for a short duration, for example, 4 cycles or longer, then the DSP 106 can become unresponsive thereby stopping the audio processing of the audio input signal. If the power pin for the GIPO is down for a period that is longer or greater than, for example, 7 cycles, the audio system 102 reboots. If the power pin is low, then the first track 250 moves to operation 254. If not, then the first track 250 moves back to the start condition and the host processor 104 continues to monitor the power pin.

In operation 254, the host processor 104 controls the amplifier 108 to mute the playback of the audio output signal. In this case, the host processor 104 mutes the amplifier 108 due to the power-down event (e.g., power drop on the power pin). It may be advantageous for the host processor 104 to control the amplifier 108 to mute the audio output signal as opposed to allowing the amplifier 108 to provide the audio output signal in moments in which the DSP 106 is exhibiting an unstable condition to prevent the amplifier 108 from generating audio artifacts. For example, the audio artifacts may be unpleasant to the end user and may even damage the plurality of loudspeakers 110 (or damage the line array of loudspeakers 110).

In operation 256, the host processor 104 triggers or initiates a first timer. The host processor 104 triggers the first timer to determine if another power down event has been detected prior to the expiration of the first timer (see operation 260). The first timer may be set to a predetermined time interval, such as for example, 8 seconds. It is recognized that the length of time utilized for predetermined time interval may vary based on the desired criteria of a particular implementation. In operation 258, the host processor 104 sets a Power Fault Flag and logs (or records/saves) the Power Fault Flag. The log indicates that the power supply is unreliable and may be provided to a user or sound engineer.

In operation 260, the host processor 104 determines whether the first timer has reached the predetermined time interval (e.g., 8 seconds) or has expired. If the first timer has not expired, then the first track 250 proceeds back to operation 252 and cycles back through operations 252, 254, 256, and 258. In this regard, the host processor 104 continues to mute the amplifier 108 for a period of 8 seconds in response to the host processor 104 detecting a power down event one or more times. If the host processor 104 determines that the first timer has expired and that no other power down events have been detected for the 8 second period, the first track 250 moves to operation 262.

For every occurrence of a power down event being detected within the 8 second time period, the host processor 104 continues to mute the amplifier 108 for every power down event detected by the host processor 104. In addition, for every power down event that is detected by the host processor 104 within the 8 second interval, the host processor 104 resets the first timer (or reinitializes the first timer back to zero).

In operation 262, the host processor 104 determines whether a DSP fault flag has been set (i.e., is high) or is low. If the DSP fault flag is set, this condition is generally indicative of the host processor 104 missing a predetermined number of data packets from the DSP 106 that correspond to the metering information. If the DSP fault flag is low, this condition generally indicates that the host processor 104 has properly received the metering information from the DSP 106. One reason for this check is, because there is no point unmuting the amplifier 108 in operation 264, if the DSP 106 is not functional as indicated by the DSP Fault. The host processor 104 sets the DSP fault flag in operation 288 in FIG. 2 in the second track 280, which is explained below in more detail.

In operation 264, the power down fault condition being detected by host processor 104 has been removed and the host processor 104 may resume operation of the amplifier 108. In this case, the amplifier 108 is no longer muted and the DSP 106 and amplifier 108 can continue to process the incoming audio signal. In operation 266, the host processor 104 clears the Power Fault Flag.

In reference to the second track 280 and in reference to operation 282, the host processor 104 determines whether metering information from the DSP 106 has been received. In one example, the host processor 104 determines whether the metering information from the DSP 106 has been received within a predetermined time frame. If the host processor 104 determines that there was a failure in either receiving the metering information from the DSP 106, the second track 280 moves to operation 284. The host processor 104 monitors the receipt of the metering data from the DSP 106. In the event the host processor 104 does not receive the metering information from the DSP 106, such a condition may be generally indicative of the DSP 106 exhibiting a failure (e.g., power failure) and the second track 280 moves to operation 284 which will be discussed in more detail below. In operation 284, the host processor 104 increments a meter failure counter (or Meter_Fail_Count) for every missed packet of digital data pertaining to the metering information from the DSP 106.

In operation 286, the host processor 104 compares the value of the Meter_Fail_Count to a first predetermined threshold value (e.g., 3). If the value of the Meter_Fail_Count is equal to the first predetermined threshold value, then the second track 280 moves to operation 288. If not, then the second track 280 moves back to operation 282.

In operation 288, the host processor 104 sets a DSP fault flag (i.e., this DSP fault flag is the same one checked at operation 262), that indicates that the metering message has been missed for, for example, 3 instances. In operation 290, the host processor 104 determines whether the Power Fault Flag has been set (i.e., high) or low. As noted in connection with operation 258, this Power Fault Flag generally corresponds to the condition in which the host processor 104 has detected a power down event. If the host processor 104 determines that the Power Fault Flag is set (or high), then the second track 280 moves to operation 292. If not, then the second track 280 moves to operation 294. The host processor 104 performs this check to ensure that the power is stable enough to attempt to reset the DSP 106.

In operation 292, the host processor 104 resets the DSP 106. This may succeed or Fail. If the Reset attempt fails, the metering data continues to be lost. In operation 294, the host processor 104 determines whether data packets for the metering information is being missed and increases the meter failure counter (or Meter_Fail_Count) for the missed data packets that was to be received from the DSP 106. The host processor 104 compares the value of the Meter_Fail_Count to a second predetermined threshold value (e.g., 6). If the value of the Meter_Fail_Count is equal to the second predetermined threshold value, then the second track 280 moves to operation 296. If not, then the second track 280 moves to operation 282 where the host processor 104 continues to check for consecutive missed meters.

In operation 296, the host processor increases a counter (e.g., ResetAttemptCount) for every reset attempt of the DSP 106 that is performed. Every time the host processor 104 resets the DSP 106 and the host processor 104 does not receive metering information, the host processor 104 increases the counter, ResetAttemptCount. If the host processor 104 determines that the ResetAttemptCount is equal to a predetermined threshold (e.g., 3), the second track 280 moves to operation 300. If not, then second track 280 of the method 200 moves to operation 282. In operation 300, the host processor 104 reboots the entire audio system 202. In operation 282, the host processor 104 checks for consecutive missed meters. If the DSP 106 is back and running and consecutive meter data is not missed, then the Meter_Fail_Count is reset as shown in operation 283 and the DSP Fault flag is reset as shown in operation 285. In this case, the host processor 104 unmutes the amplifier 108.

It is recognized that the controllers/devices as disclosed herein and in the attached Appendix may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An audio system for providing a fault recovery mechanism, the system comprising:
- at least one digital signal processor (DSP) being programmed to:
  - process an audio input signal to transmit an audio output signal to an amplifier for playing back the audio output signal in a listening environment;
  - transmit metering information indicative of audio attributes employed by the at least one DSP while processing the audio input signal; and
- at least one host processor being programmed to;
  - receive the metering information; and
  - control an amplifier to deactivate playing back the audio output signal in the listening environment at least based on the at least one host processor not receiving the metering information within a predetermined time frame.

2. The audio system of claim 1, wherein the at least one host processor is further programmed to control the amplifier to deactivate playing back the audio output signal in the listening environment prior to rebooting the system.

3. The audio system of claim 1, wherein the at least one host processor is further programmed to increment a meter fail counter in response to not receiving the metering information.

4. The audio system of claim 3, wherein the at least one host processor is further programmed to monitor a power input signal and to determine whether power has been lost based on the power input signal after the meter fail counter has reached a first predetermined value.

5. The audio system of claim 4, wherein the at least one host processor is further programmed to reset the at least one DSP in response to determining that the power has been lost.

6. The audio system of claim 5, wherein the at least one host processor is further programmed to increment the meter fail counter in response to not receiving the metering information after the at least one DSP has been reset.

7. The audio system of claim 6, wherein the at least one host processor is further programmed to reset the at least one DSP after the meter fail counter has reached a second predetermined value.

8. The audio system of claim 7, wherein the at least one host processor is further programmed to reboot the audio system in response to the host processor resetting the at least one DSP a predetermined number of times.

9. The audio system of claim 1, wherein the at least one host processor is further programmed to monitor a power input signal prior to controlling the amplifier to deactivate playing back the audio output signal in the listening environment.

10. The audio system of claim 9, wherein the at least one host processor is further programmed to control the amplifier to deactivate playing back the audio output signal in the listening environment in response to determining that power has been lost based on the power input signal.

11. The audio system of claim 10, wherein the at least one host processor is further programmed to initiate a first timer after in response to determining that the power has been lost based on the power input signal.

12. The audio system of claim 11, wherein the at least one host processor is further programmed to control the amplifier to deactivate playing back the audio output signal in the listening environment while the first timer is running.

13. The audio system of claim 12, wherein the at least one host processor is further programmed to determine whether the at least one DSP is transmitting the metering information upon expiration of the first timer.

14. The audio system of claim 13, wherein the at least one host processor is further programmed to control the amplifier to activate playing back the audio output signal in response to determining that the at least one DSP is transmitting the metering information.

15. An audio system for providing a fault recovery mechanism, the system comprising:

at least one digital signal processor (DSP) being programmed to:

process an audio input signal to transmit an audio output signal to an amplifier for playing back the audio output signal in a listening environment;

a plurality of loudspeakers configured to transmit the audio output signal into a listening environment; and at least one host processor being programmed to;

monitor a power input signal; and control an amplifier to deactivate transmitting the audio output signal to the plurality of loudspeakers at least based on the at least one host processor determining that power on the power input signal has been lost, wherein the at least one host processor controls the amplifier to deactivate transmitting the audio output signal to the plurality of loudspeakers prior to rebooting the audio system to prevent audio artifacts from being transmitted to a plurality of loudspeakers.

16. The audio system of claim 15, wherein the at least one DSP is further programmed to transmit metering information indicative of audio attributes employed by the at least one DSP to the at least one host processor.

17. The audio system of claim 16, wherein the at least one DSP is further programmed to control the amplifier to deactivate transmitting the audio output signal to the plurality of loudspeakers based at least on the at least one host processor not receiving the metering information within a predetermined time frame.

18. A method for providing a fault recovery mechanism for an audio system, the method comprising:

processing, via at least one digital signal processor (DSP), an audio input signal to transmit an audio output signal to an amplifier for playing back the audio output signal in a listening environment;

transmitting metering information indicative of audio attributes employed by the at least one DSP while processing the audio input signal;

receiving, at least one host processor, the metering information; and controlling the amplifier to deactivate playing back the audio output signal in the listening environment at least based on the at least one host processor not receiving the metering information within a predetermined time frame.

19. The method of claim 18 further comprising controlling the amplifier to deactivate playing back the audio output signal in the listening environment prior to rebooting the audio system.

20. The method of claim 18, wherein the metering information corresponds to any one or more of voltage readings of the audio input signal, current readings of the audio input signal, volume level of the audio input signal.

* * * * *